United States Patent [19]

Hauschild

[11] 3,907,538

[45] Sept. 23, 1975

[54] PROCESSES FOR PREVENTING THE FORMATION OF DEPOSITS ON THE INTERNAL WALLS OF ROTARY KILNS DURING THE PRODUCTION OF CITRATE-SOLUBLE ALKALI-METAL-CONTAINING PHOSPHATE FERTILIZERS

[75] Inventor: Ulrich Hauschild, Hannover, Germany

[73] Assignee: Kali-Chemie Aktiengesellschaft, Hannover, Germany

[22] Filed: Dec. 18, 1973

[21] Appl. No.: 425,784

[30] Foreign Application Priority Data
Dec. 22, 1972 Germany............................. 2262820

[52] U.S. Cl.............................. 71/34; 71/44; 71/62; 71/DIG. 3
[51] Int. Cl.............................................. C05b 13/06
[58] Field of Search.............. 71/47, DIG. 3, 31, 33, 71/34, 36, 62, 44, 45, 46, 57; 423/167, 305, 308, 312

[56] References Cited
UNITED STATES PATENTS
3,291,594  12/1966  Nickerson............................ 71/47 X
3,713,803  1/1973  Holst et al. ......................... 71/47 X

*Primary Examiner*—Charles N. Hart
*Assistant Examiner*—Ferris H. Lander
*Attorney, Agent, or Firm*—Michael S. Striker

[57] ABSTRACT

A process for preventing the formation of deposits on the internal walls of rotary kilns during the production of citrate-soluble alkali-metal-containing phosphate fertilizers by calcination in such kilns of a mixture of a rock phosphate, alkali-metal hydroxide, carbonate, or phosphate, and, if required, silica, which comprises adding to the mixture before or during its passage through the kiln an amount of a magnesium compound calculated as magnesium oxide that is between 0.01 and 10% by weight of the mixture on a dry weight basis.

3 Claims, No Drawings

3,907,538

PROCESSES FOR PREVENTING THE FORMATION OF DEPOSITS ON THE INTERNAL WALLS OF ROTARY KILNS DURING THE PRODUCTION OF CITRATE-SOLUBLE ALKALI-METAL-CONTAINING PHOSPHATE FERTILIZERS

BACKGROUND OF THE INVENTION

Rotary kilns have long been used heretofore for the thermal conversion of rock phosphate with alkali-metal oxides to produce phosphate fertilizers. The walls of these kilns are lined with special highly refractory bricks to protect the oven wall as well as to facilitate the passage therethrough of the mixture that is to be converted therein. The mixture that is to be converted is introduced at the upper end of the kiln which is supported at a slight inclination and passes therethrough countercurrent to the flow of the heating gases. As fuel, hydrogen-rich fuels such as petroleum oils are preferred. In many cases, steam is also introduced. The mixture that is to be converted is introduced mostly while cold and is gradually heated during the course of its flow through the kiln. The calcination or sintering and conversion of the materials occurs essentially in the final third portion of the rotary kiln in which, dependent upon the mixture that is being converted, temperatures between 900° and 1600°C are maintained.

The chemical and physical reactions that occur in the rotary kiln during this conversion are complicated and are only incompletely understood. The conditions for treating the material that is to be converted is for this reason determined and controlled solely in an empirical manner.

Various processes are known in the art for the production of calcined or sintered alkali-metal phosphate fertilizers in rotary kilns. Thus, for example, the calcined phosphate that is known under the designation "Rhenania-Phosphat" is produced by conversion of rock phosphate with sodium carbonate at a temperature above 1200°C. In accordance with this process, a molecular ratio of sodium oxide to phosphorus pentoxide ($Na_2O:P_2O_5$) of at least 1.1:1 is used and silicon dioxide in the form of sand is added in such an amount that the amount of calcium oxide that is in excess of the molecular ratio of calcium oxide to phosphorus pentoxide ($CaO:P_2O_5$) of 2:1 is bound in the form of calcium silicate ($2CaO \cdot SiO_2$). The essential principles of this process have been described in German Pat. No. 481,177 (or U.S. Pat. No. 1,799,882).

Recently processes were developed in which mixtures of alkali-metal carbonates and a solution of an alkali-metal hydroxide or a solution of alkali-metal hydroxide alone is used as a reagent for the conversion of rock phosphates to alkali-metal-containing phosphate fertilizers in rotary kilns. Since the introduction of alkali-metal hydroxide solutions presents great difficulties, it was suggested in our U.S. Pat. No. 3,713,803 and in our copending application Ser. No. 632,407 (now U.S. Pat. No. 3,802,861) that the alkali-metal hydroxide solution be carbonated and evaporated with exhaust gases from the rotary kiln before or after, or both before and after, the mixing with the rock phosphate and with the eventually required amount of silicon dioxide, and simultaneously the mixture be agglomerated.

In the process described in our U.S. Pat. No. 3,552,944, a calcinable granulate is made by addition of a previously calcined product to a mixture of rock phosphate, alkali-metal hydroxide solution, and sand. A portion of the alkali-metal-oxide-supplying compound that is required for the conversion can be introduced in the form of an alkali-metal hydroxide solution directly into the first third of the rotary kiln if the remaining portion of the alkali-metal-oxide supplying compound is introduced with the mixture of the rock phosphate and sand in the form of an alkali-metal carbonate, as described in our U.S. Pat. No. 3,719,464. It is also to be noted in Belgian Pat. No. 783,173 that, by observing certain precautions, the alkali-metal hydroxide solution can be applied directly to the mixture in the rotary kiln after the mixture has reached a temperature of at least 400°C. In all of these processes, a calcined potassium and phosphate fertilizer composition containing at least 50% of available fertilizing ingredients, namely, potassium oxide and phosphorus pentoxide, can also be produced directly.

In the foregoing processes, the main portion of the fluorine remains in the conversion product and is no longer combined in a form that is detrimental to the solubility of the phosphorus pentoxide in a 2% citric acid solution or in Petermann solution. Calcined alkali-metal phosphate fertilizers having low fluorine contents can also be produced in rotary kilns. For this purpose, phosphoric acid instead of silica is added to the mixture that is to be calcined. The rock phosphate is mixed together with a sodium-oxide-supplying compound and phosphoric acid, or sodium phosphate, or both, and the mixture is preferably formed into granules. In this case, the calcining temperature is generally between 1300° and 1600°C. The solubility of the product in 2% citric acid and its fluorine content are largely dependent upon the conditions under which the process was performed as specified, for example, in Belgian Pat. No. 743,554.

In all of these continuous processes for the alkaline conversion of rock phosphates in rotary kilns, the operations must be constantly and carefully supervised. Although in accordance with more recent processes, the difficulties in the colder part of the rotary kiln can be eliminated, minor and unavoidable changes in the composition of the mixture or in the reaction conditions can cause problems that lead to agglomeration, caking, or partial melting of the mixture, and thus to the formation of deposits on the walls of the rotary kiln. In such cases, by empirical changes in the reaction conditions, these undesirable results can more or less be obviated. However, such changes often produce an undesirable reduction of the production rate and most often do not prevent a gradual closing of the passages in the kiln through which the mixture flows because of the formation of such deposits. The reasons for the occurrence of these undesirable effects, which can extend over a relatively long zone of the furnace, are manifold and, in part, not yet understood so that all measures taken thus far are not technically satisfactory. As a result, the occurrence of such effects produces an increase in the cost of the production of such fertilizers.

Drastic mechanical procedures have been proposed for removing these deposits on the kiln walls, for instance, the explosive breaking up of the deposits with a safe explosive such as the $CO_2$-cartridge, or by use of a gun such as the Western kiln gun. The use of these means, however, damages the brick lining of the kiln to a greater or lesser extent.

SUMMARY OF THE INVENTION

The processes of the present invention provide a method for preventing the formation of such deposits on the inner walls of the rotary kilns during the production of citrate-soluble alkali-metal-containing calcined phosphate fertilizers from rock phosphates, using alkali-metal carbonates, alkali-metal phosphates, or solutions of alkali-metal hydroxides, and, if required, silica or silicic acid, at temperatures between 900° and 1600°C. Because no deposits are formed on the walls of such rotary kilns when the processes of the precent invention are used, the drastic procedures that have previously been required to dislodge or remove the deposits that formerly formed on such walls are no longer required and this invention consequently represents a substantial advance in the art.

In accordance with the process of the present invention, the aforementioned difficulties and disadvantages are largely or even completely obviated during the calcining process. In this method, magnesium compounds of the group consisting of carbonates, oxides, hydroxides, and silicates of magnesium are added to the mixture of rock phosphate and alkali-metal oxide-supplying compound before or during, or both before and during, the flow of the mixture through the furnace in such a quantity that the content of the magnesium compound calculated as magnesium oxide is between 0.01 and 10% by weight of the dry weight of the starting mixture.

Powdered magnesite, which is a naturally occurring form of magnesium carbonate, is preferred over other magnesium compounds for this purpose. However, other carbonates, such as hydromagnesite ($3MgCO_3 \cdot Mg(OH)_2 \cdot 3H_2O$) and sodium magnesium carbonate ($Na_2Mg(CO_3)_2$) or similar mixed magnesium carbonates are also suitable. The oxides and hydroxides of magnesium, such as magnesium oxide ($MgO$) and magnesium hydroxide ($Mg(OH)_2$) can also be used. Magnesium silicates, such as enstatite ($MgSiO_3$) or talc ($Mg_2Si_4O_{10} \cdot Mg(OH)_2$) can be used if silicon dioxide is required in the mixture. The magnesium compounds can be used singly or in any desired admixture with one another, and in any desired ratio with respect to each other. The magnesium compounds need not be ground to any specified degree of fineness nor need they be added in anhydrous form.

The magnesium compound may be added to the mixture by any suitable means and it can be added directly to the mixture of rock phosphate and alkali-metal-oxide-supplying compound prior to being charged into the rotary kiln or it can be added directly to the mixture in the rotary kiln, for example, by being blown into the kiln either at its outlet or inlet. It can also be sprayed directly into the kiln in the form of a suspension in water or other liquid.

As shown in the examples hereinafter, the addition of even relatively small quantities of magnesium compounds produces a marked improvement in the passage through the kiln of the mixture that is to be converted. The presence of the magnesium compound in the mixture that is to be converted even in an amount less than 0.1% by weight of magnesium oxide based on the dry weight of the mixture has a perceptible effect and good results are generally obtained if the quantity of magnesium oxide that is added is equivalent to between 0.5 and 5% by weight of magnesium oxide. If the content of magnesium oxide exceeds 10% by weight, the physical and chemical characteristics of the final product are changed so greatly that the addition of such further amounts produces no further improvement.

It could not be expected from the known state of the art that the addition of such relatively small quantities of magnesium compounds could result in an improvement of the calcining process in the rotary kiln in the manner disclosed herein. German Pat. No. 498,662 suggests the use of a mixture of alkali-metal carbonates and magnesium salts as reagents for converting rock phosphate to citrate-soluble phosphate fertilizers but a requirement of the process is that the fluorine content of the mixture that is to be converted be reduced to at least 1% by weight of the mixture before the mixture has reached a temperature of approximately 1000°C. The use of a rotary kiln with a special flame guide is also suggested, and the temperatures in the kiln are maintained between approximately 800° and 1000°C for a period between 1 and 2 hours. Such reaction conditions cannot be maintained in conventional rotary kilns through which the mixture is normally passed within a period not longer than 1 hour. From teh description of this method in the said patent it could not be expected that magnesium compounds would exert any advantageous influence whatsoever upon the processing of the mixture in the rotary kiln as disclosed herein.

It is not yet possible to furnish an unequivocal explanation for the particular and evidently specific effect of the specified magnesium compounds in the process of the present invention. It is to be assumed, however, that, during the passage of the mixture through the kiln, the magnesium compounds are decomposed and that the magnesium combines to produce a different chemical compound. In any case, it has been unequivocally extablished that, during the production of alkali-metal-containing calcined phosphate fertilizers, regardless of whether or not tne expulsion of fluorine from the mixture in involved in the process, the entire calcining and converting operation is smoother and requires less supervision. The possibility that strongly adherent deposits or so-called rings might form very rapidly and that agglomerations might interfere with the operation of the kiln no longer exists if the specified quantities of magnesium compounds are present. The material that is to be converted can be passed through the rotary kiln in a shorter period, thereby increasing the amount passed through during a specific period, so that the overall economy of the production of citrate-soluble alkali-metal-containing phosphate fertilizers is improved. Furthermore, the relatively small quantities of magnesium oxide that are present in the calcined phosphate fertilizer do not adversely affect its good chemical and physical properties or its agricultural utility. The magnesium, regardless of how it is combined in the calcined phosphate fertilizer, is readily absorbed by plants. Futhermore, many soils that are being cultivated today lack adequate amounts of magnesium and consequently the magnesium content of the fertilizers is not to be regarded as a mere filler or contaminant but as a valuable plant nutrient.

The products obtained in accordance with the processes of the present invention can be formed into granules. They can also be admixed with other fertilizers and such mixtures can also be formed into granules, so that the resulting compositions can be supplied in a form which is suitable for general use in agriculture.

DETAILED DESCRIPTION

The examples which follow hereinafter were selected solely for purposes of illustration and are accordingly not to be regarded as restrictive of the invention. The processes which are described in these examples were conducted in semiplant equipment in which the same reaction conditions can be maintained that are required in conventional plant rotary kilns for the production of citrate-soluble alkali-metal-containing phosphate fertilizers.

COMPARATIVE EXAMPLE

In a conventional mixer a North African rock phosphate containing 37.2% phosphorus pentoxide was continuously mixed with sodium carbonate and sand and continuously passed through a heated rotary kiln lined internally with a basic brick lining. The proportions by weight of rock phosphate to sodium carbonate to sand that were used, which are required for the production of a commerical citrate-soluble alkali-metal-containing phosphate fertilizer, are 1000:387:80, respectively. The mixture was heated in the kiln to a maximum temperature of 1270°C. The calcined phosphate fertilizer thus produced, which contained 29.2% phosphorus pentoxide, was soluble to the extend of 99.5% in 2% aqueous citric acid solution and to the extent of 98.5% in Petermann solution (ammonical ammonium citrate solution).

Even at the beginning of the run, the mixture containing the rock phosphate during its passage through the kiln formed deposits on the lining thereof that could not be dislodged except by mechanical means. After operation in this manner for 1 or 2 days, the deposits which formed had to be removed with increasing frequency so that the operation was thereby adversely affected and at times had to be stopped so that the deposits could be removed by mechanical means.

EXAMPLE 1

The operations that are described in the foregoing comparative example were repeated with the exception that, before the mixture was charged into the kiln, powdered magnesite having a content of 45% by weight of magnesium oxide was mixed with the mixture in an amount corresponding to 19 parts by weight of the dry mixture, so that the mixture included approximately 0.85% by weight of magnesium oxide.

In contrast to the results obtained in the comparative example, no deposit formed on the lining of the kiln and the operation continued to run undisturbed and unaffected in any way during a longer period of several days. The calcined phosphate that was produced contained 28.9% phosphorus pentoxide and had a solubility of 99.6% by weight in a 2% citric acid solution and 98.6% by weight in Petermann solution.

The operations that are described in this example were repeated with the exception that the amount of magnesite that was added to the mixture was 1.9% by weight to each 1000 parts by weight of the mixture, corresponding to a content of approximately 0.085% by weight of magnesium oxide. Despite the reduction in the amount of magnesium oxide, not even a slight difference was detected in the operation of the kiln. Small deposits actually formed even after several days but these seldom required the use of mechanical means for their dislodgement or removal.

EXAMPLE 2

Into a kiln similar to that used in Example 1 and the foregoing comparative example, a granulated moist mixture of 1000 parts by weight of Kola Peninsula apatite concentrate having a content of 39.1% by weight of phosphorus pentoxide, 270 parts by weight of sodium carbonate, 106 parts by weight of sand, 180 parts by weight of a solution of sodium hydroxide containing 48.7% by weight of sodium hydroxide, and 32 parts by weight of magnesium hydroxide were charged continuously. In producing the granulate, the magnesium hydroxide was preliminarly added to the solution of sodium hydroxide and suspended therein (MgO:1,48%)

Substantially no deposits formed on the lining of the rotary kiln during a period of several days. The calcined product contained 29.0% by weight of phosphorus pentoxide and 1.9% by weight of magnesium oxide and was soluble to the extent of 99.4% in 2% citric acid solution and 98.9% in Petermann solution.

EXAMPLE 3

Into a paddle mixer-conveyer provided with helical blades was continuously produced a granular mixture that was prepared from 1000 parts by weight of North African rock phosphate having a phosphorus pentoxide content of 37.2%, 80 parts by weight of sand, and about 690 parts by weight of a slurry containing potassium hydroxide and potassium carbonate that has a content of alkali computed as potassium hydroxide equivalent to 64% by weight, of which 70% was in the form of potassium carbonate. This slurry as prepared by spraying 800 parts by weight of an aqueous solution containing 50% by weight of potassium hydroxide into the stream of hot effluent gas issuing from the rotary kiln that is referred to in the comparative example hereinbefore. During the preparation of the granulated mixture, exhaust gases from the said rotary kiln were passed through the paddle mixer-conveyer, thereby producing a friable or granulated mixture. The granulated mixture was passed continuously through the rotary kiln, in which it was heated to a maximum temperature of 1130°C. Powdered magnesite having a content of 45% by weight of magnesium oxide was insufflated into the burner side of the kiln by means of a stream of compressed air, that is, in a direction countercurrent to the flow of the granulated mixture, at a rate of 120 parts by weight to 1000 parts by weight of the rock phosphate in the mixture. During this continuous operation no deposits formed on the walls of the kiln. (MgO:3.15%). The resulting calcined product, after cooling and grinding, was found by analysis to contain 25.7% by weight of phosphorus pentoxide, 23.1% by weight of potassium oxide and 3.8% by weight of magnesium oxide and to be soluble to the extent of 99.8% in a 2% citric acid solution and 99.0% in Petermann solution.

On repeating the operation without the addition of magnesite, the mixture had a tendency to agglomerate and deposit so that it was necessary to use mechanical means to dislodge or remove the deposits from the walls of the kiln.

EXAMPLE 4

A mixture of Florida rock phosphate having a content of 34.4% phosphorus pentoxide, soda, and talc which had a content of 64% silicon dioxide and 31% magnesium oxide, in the ratio of 1000:365:110 parts by weight, respectively, was continuously charged into the rotary kiln that is described in the comparative example hereinbefore. The silica that is required in the calcination reaction was supplied by the silica of the talc. No substantial deposits were observed on the walls of the kiln during the calcination. (MgO:2.31%)

The product which was obtained at a maximum temperature of 1240°C had a phosphorus pentoxide content of 26.9% and a magnesium oxide content of 2.7%. It dissolved to the extent of 99.2 in 2% citric acid solution and 98.7% in Petermann solution.

EXAMPLE 5

In a continuous operation, a concentrate of Kola Peninsula apatite having a phosphorus pentoxide content of 39.1%, aqueous phosphoric acid containing 70% by weight of phosphoric acid, and sodium carbonate in the ratio of 1000:154:146 parts by weight, respectively, were mixed together with water, formed into granules, and dried. Subsequently the small granules were passed into a semiplant rotary kiln in which it was heated to a maximum temperature of 1500°C. The phosphorus oxide content of the final product was 43.5%. It also had a fluorine content of 0.11% and dissolved to the extent of 97% in 2% citric acid solution.

Agglomeration of the granules and the beginning of the formation of deposits was sometimes observed, especially at the beginning of the hot reaction zone, but these effects could be prevented only with difficulty by controlling the operating conditions of the kiln. This unstable condition of the operations was changed immediately when powdered magnesite was insufflated into the kiln at its burner side in an amount of 15 parts by weight to 1000 parts by weight of the rock phosphate in the mixture. The granules no longer tended to form deposits or agglomerates.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims.

1. A process for preventing the formation of deposits on the internal walls of flame-heated rotary kilns during the production of a citrate-soluble alkali-metal-containing phosphate fertilizer therein by calcination at a temperature between 900° and 1600°C of a mixture of (a) phosphate rock, (b) an alkali-metal carbonate, solution of an alkali-metal hydroxide, or a mixture of both, or an alkali-metal phosphate, or a mixture of phosphoric acid and an alkali-metal-oxide-supplying compound, and, when using an alkali-metal carbonate or a solution of an alkali-metal hydroxide, or both, (c) silica in an amount that is sufficient to bind as $Ca_2SiO_4$, all CaO that is present in the mixture that is in excess of the amount represented by the molecular ratio of 2 CaO:1 $P_2O_5$, which process comprises adding to the mixture before or during its passage through the kiln a magnesium compound selected from the group consisting of magnesium carbonates, magnesium oxides, magnesium hydroxides, magnesium silicates, and mixtures thereof, in an amount calculated as magnesium oxide that is equivalent to between 0.01 and 10% by weight of the dry mixture.

2. A process as defined in claim 1 in which the silica is added in form of silicates of magnesium.

3. A process as defined in claim 1 in which the amount of magnesium compound calculated as magnesium oxide that is added to the mixture is between 0.5 and 5% by weight based upon the dry weight of the mixture.

* * * * *